United States Patent
Soto

(10) Patent No.: US 10,556,480 B2
(45) Date of Patent: Feb. 11, 2020

(54) VEHICLE HVAC SYSTEM

(71) Applicant: Nissan North America, Inc., Franklin, TN (US)

(72) Inventor: Amilkar Abraham Soto, Toluca (MX)

(73) Assignee: Nissan North America, Inc., Franklin, TN (US)

( * ) Notice: Subject to any disclaimer, the term of this patent is extended or adjusted under 35 U.S.C. 154(b) by 406 days.

(21) Appl. No.: 15/407,314

(22) Filed: Jan. 17, 2017

(65) Prior Publication Data

US 2018/0201087 A1 Jul. 19, 2018

(51) Int. Cl.
*B60S 1/54* (2006.01)
*B60H 1/00* (2006.01)
*B60H 1/34* (2006.01)

(52) U.S. Cl.
CPC ..... *B60H 1/00028* (2013.01); *B60H 1/00564* (2013.01); *B60H 1/00842* (2013.01); *B60H 1/3421* (2013.01)

(58) Field of Classification Search
CPC ............ B60H 1/00564; B60H 1/00871; B60H 1/345; B60H 1/34; B60H 1/3407; B60H 1/0028; B60H 1/00842
USPC .................. 454/121, 124, 126, 152–155, 191
See application file for complete search history.

(56) References Cited

U.S. PATENT DOCUMENTS

| | | | |
|---|---|---|---|
| 3,572,233 A * | 3/1971 | Bar Alfons .......... | B60H 1/3428 454/154 |
| 5,354,114 A | 10/1994 | Kelman et al. | |
| 5,762,395 A * | 6/1998 | Merrifield .......... | B60H 1/00028 180/90 |
| 6,447,041 B1 | 9/2002 | Vandersluis et al. | |
| 8,408,980 B2 * | 4/2013 | Nanaumi ........... | B60H 1/00564 454/121 |
| 2007/0006986 A1 | 1/2007 | Derleth et al. | |
| 2007/0128997 A1 | 6/2007 | Prince et al. | |
| 2016/0129762 A1* | 5/2016 | Brinas ................. | B60H 1/3428 454/155 |

FOREIGN PATENT DOCUMENTS

| | | |
|---|---|---|
| EP | 0707990 A1 | 4/1996 |
| FR | 2623776 A1 | 6/1989 |
| KR | 1005933770000 B1 | 6/2006 |

\* cited by examiner

*Primary Examiner* — Vivek K Shirsat
(74) *Attorney, Agent, or Firm* — Global IP Counselors, LLP

(57) ABSTRACT

A HVAC system that includes an air duct connected to an air handler and having a tubular housing with a first airflow path and a second airflow path therein separated from the first airflow path. One end of the tubular housing having a first air outlet in fluid communication with only the first airflow path and a second air outlet in fluid communication with only the second airflow path. The first air outlet and the second air outlet are adjacent to one another. A vent assembly having a housing surrounding first airflow directing members and second airflow directing members. The vent assembly is installed to the end of the tubular housing such that the first airflow directing members direct airflow from the first air outlet in a first direction. The second airflow directing members direct airflow from the second air outlet in a second direction.

20 Claims, 13 Drawing Sheets

VEHICLE HVAC SYSTEM

BACKGROUND

Field of the Invention

The present invention generally relates to a vehicle HVAC system (Heating, Ventilation and Air Conditioning system). More specifically, the present invention relates to a vehicle HVAC system that includes a single air duct and vent assembly that defines two separated air flow paths at a single end of the air duct, with a first air flow path being arranged to provide conditioned air into the passenger compartment for the comfort of a passenger and a second air flow path being dedicated to directing air to a side window surface defogging the side window of the vehicle.

Background Information

All modern vehicles typically include some sort of heating, ventilation and air conditioning system (HVAC system) configured to direct air into a passenger compartment for improving the comfort of passengers therein, and are also configured to direct air to interior glass surfaces for the purpose of defogging those surfaces. Typically, a first duct is provided to direct air to various locations within the passenger compartment for the benefit of the passengers. A second duct, separate from the first duct, is provided to direct air to the interior glass surface(s). The first and second ducts are usually installed within an instrument panel at the front of the passenger compartment below a windshield within the vehicle.

SUMMARY

One object of the present disclosure is to reduce the overall number of duct installed within the instrument panel of a vehicle.

Another object of the present disclosure is to define two separated air flow paths within a single duct member.

In view of the state of the known technology, one aspect of the present disclosure is to provide an HVAC system with an air handler, a blower, an air duct and a vent assembly. The air handler has an air inlet, an airflow direction control mechanism configured to selectively direct airflow out of the air handler to a first outlet or a second outlet, or simultaneously to both the first outlet and the second outlet. The blower is coupled to the air handler and is selectively operable at a plurality of blowing speeds to generate airflow through the air handler. The air duct is connected to the air handler and has a tubular housing defining and completely surrounding both a first airflow path and a second airflow path that is separated from the first airflow path. A first end of the tubular housing defines a first air inlet in fluid communication with only the first airflow path. A second air inlet of the tubular housing is in fluid communication with only the second airflow path. The tubular housing defines a first air outlet in fluid communication with only the first airflow path and a second air outlet in fluid communication with only the second airflow path. The first air inlet and the second air inlet are adjacent to one another at the first end of the tubular housing. The first air outlet and the second air outlet are adjacent to one another at a second end of the tubular housing. The first air inlet is in direct fluid communication with the first outlet of the air handler. The second air inlet is in direct fluid communication with the second outlet of the air handler. The vent assembly has a housing that surrounds both first airflow directing members and second airflow directing members. The vent assembly is installed to the tubular housing at the second end of the tubular housing such that the first airflow directing members direct airflow from the first air outlet in a first direction away from the tubular housing and the second airflow directing members direct airflow from the second air outlet in at least a second direction away from the tubular housing.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
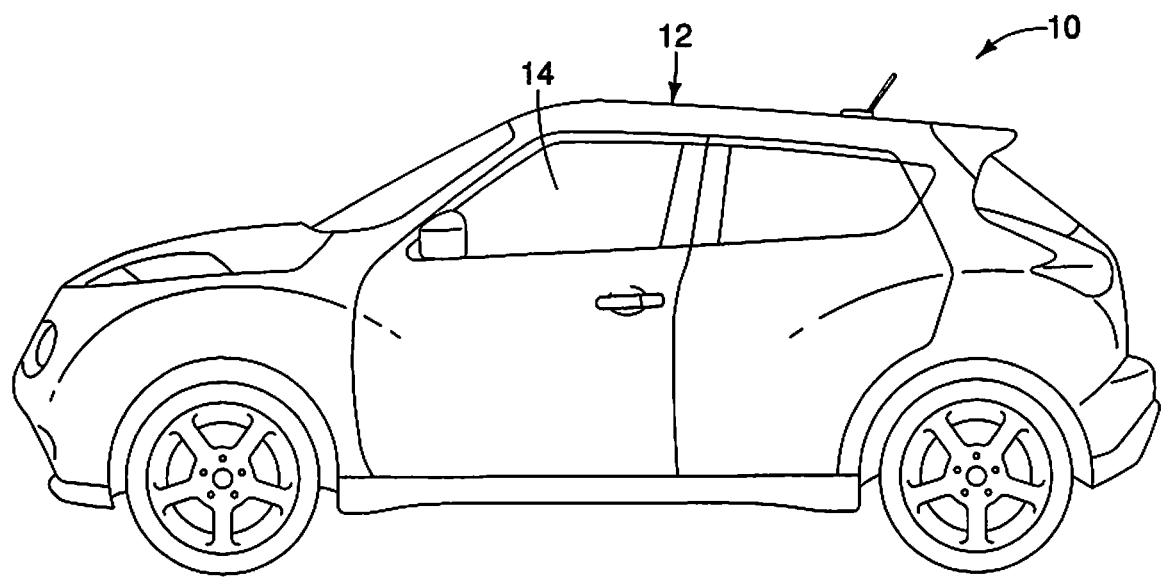
FIG. 1 is a side view of a vehicle that includes an HVAC system (heating, ventilation and air conditioning system) within a passenger compartment in accordance with a first embodiment.
Figure 2:
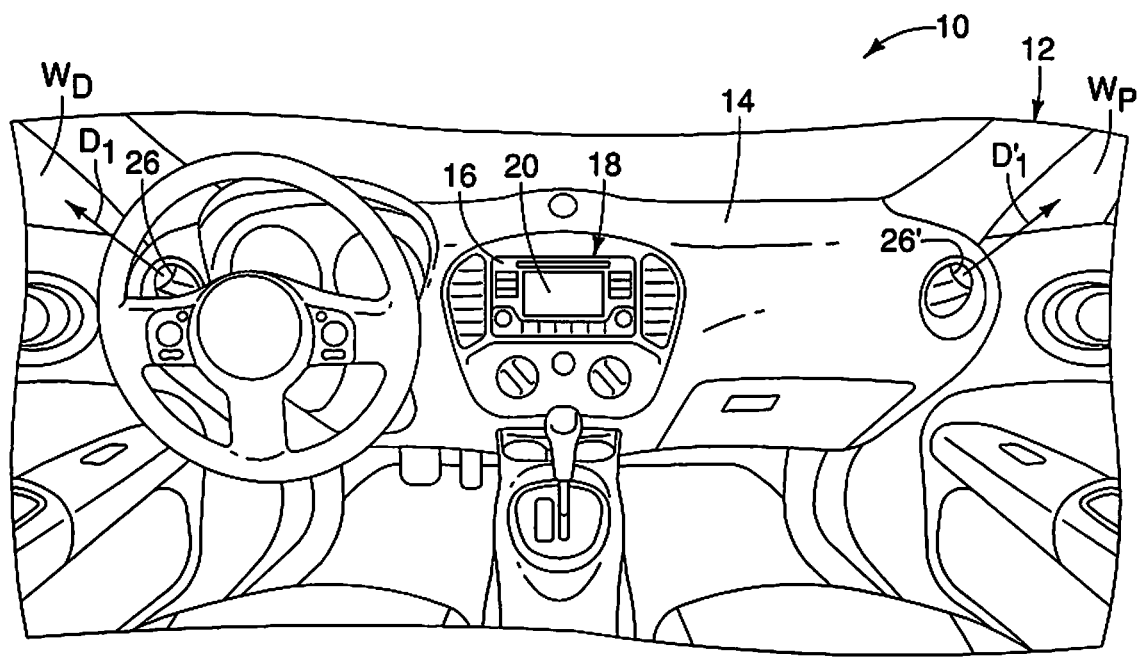
FIG. 2 is a view of the passenger compartment of the vehicle depicted in FIG. 1, showing an instrument panel with vent assemblies of the HVAC system in accordance with the first embodiment.

Referring initially to FIGS. 1 and 2, a vehicle 10 is illustrated in accordance with a first embodiment. The vehicle 10 includes a vehicle body structure 12 that defines a passenger compartment 14 with an instrument panel 16 (FIG. 2). An HVAC system 18 (heating, ventilation, and air conditioning system) is at least partially installed within the instrument panel 16 of the vehicle 10 within the passenger compartment 14, as described in greater detail below.

The HVAC system 18 includes several conventional components, such as a compressor (not shown), a condenser (not shown), a refrigerant expansion device (not shown) and an evaporator (not shown). The HVAC system 18 also includes a controller 20 (FIGS. 2, 3 and 5), an air handler 22 (FIGS. 4-6), an air duct 24 (FIGS. 4-15) and a pair of vent assemblies 26 and 26' (FIGS. 4, and 16-19).

Figure 3:
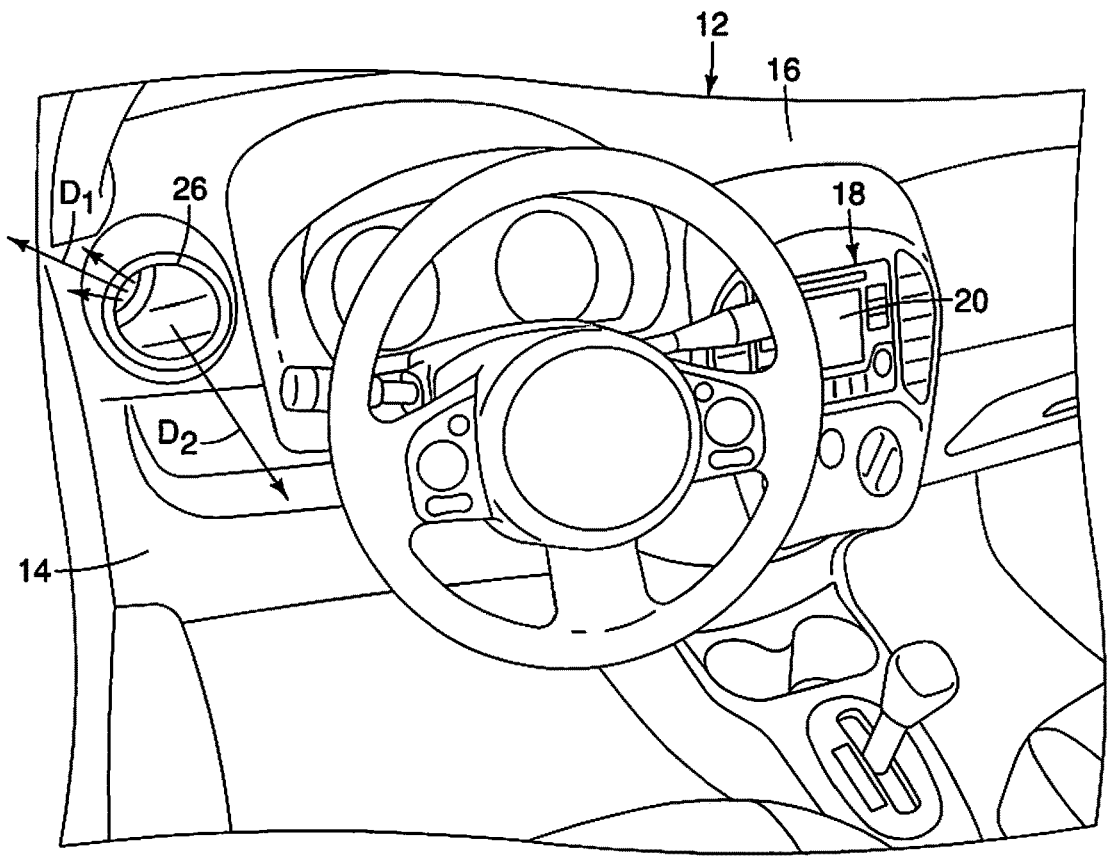
FIG. 3 is a perspective view of a driver's side portion of the instrument panel showing the vent assembly with a portion thereof directing defog-airflow directly to a driver's side window in accordance with the first embodiment.
Figure 4:
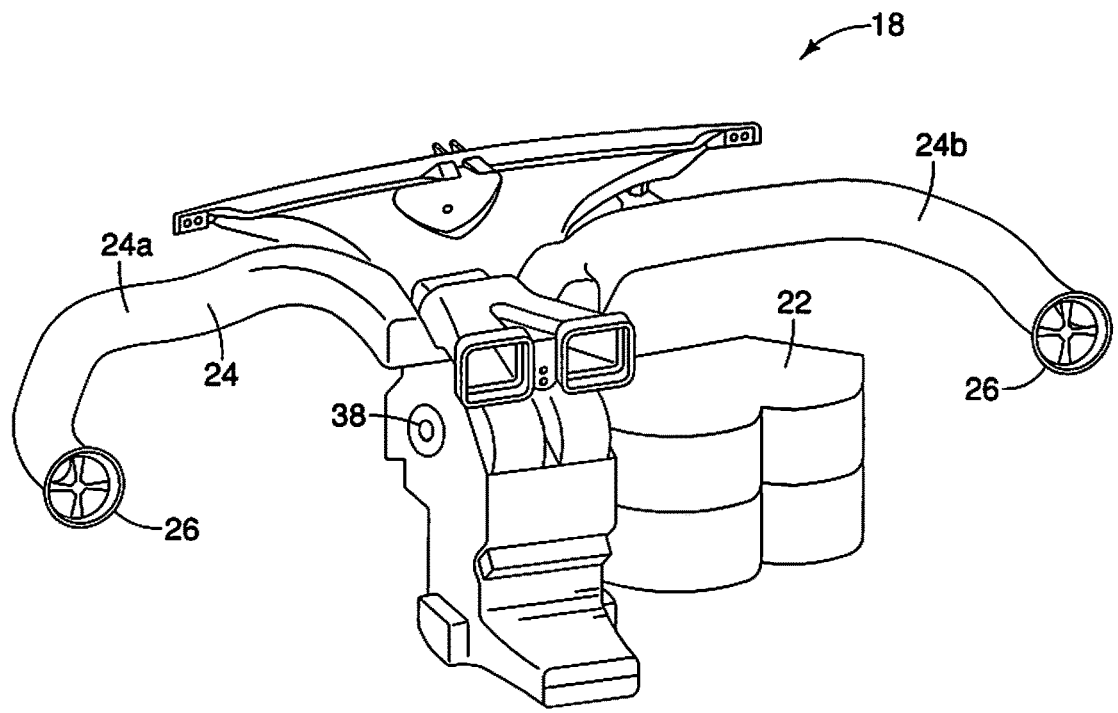
FIG. 4 a perspective view of the HVAC system shown removed from the vehicle, showing an air duct and the vent assemblies in accordance with the first embodiment.
Figure 5:
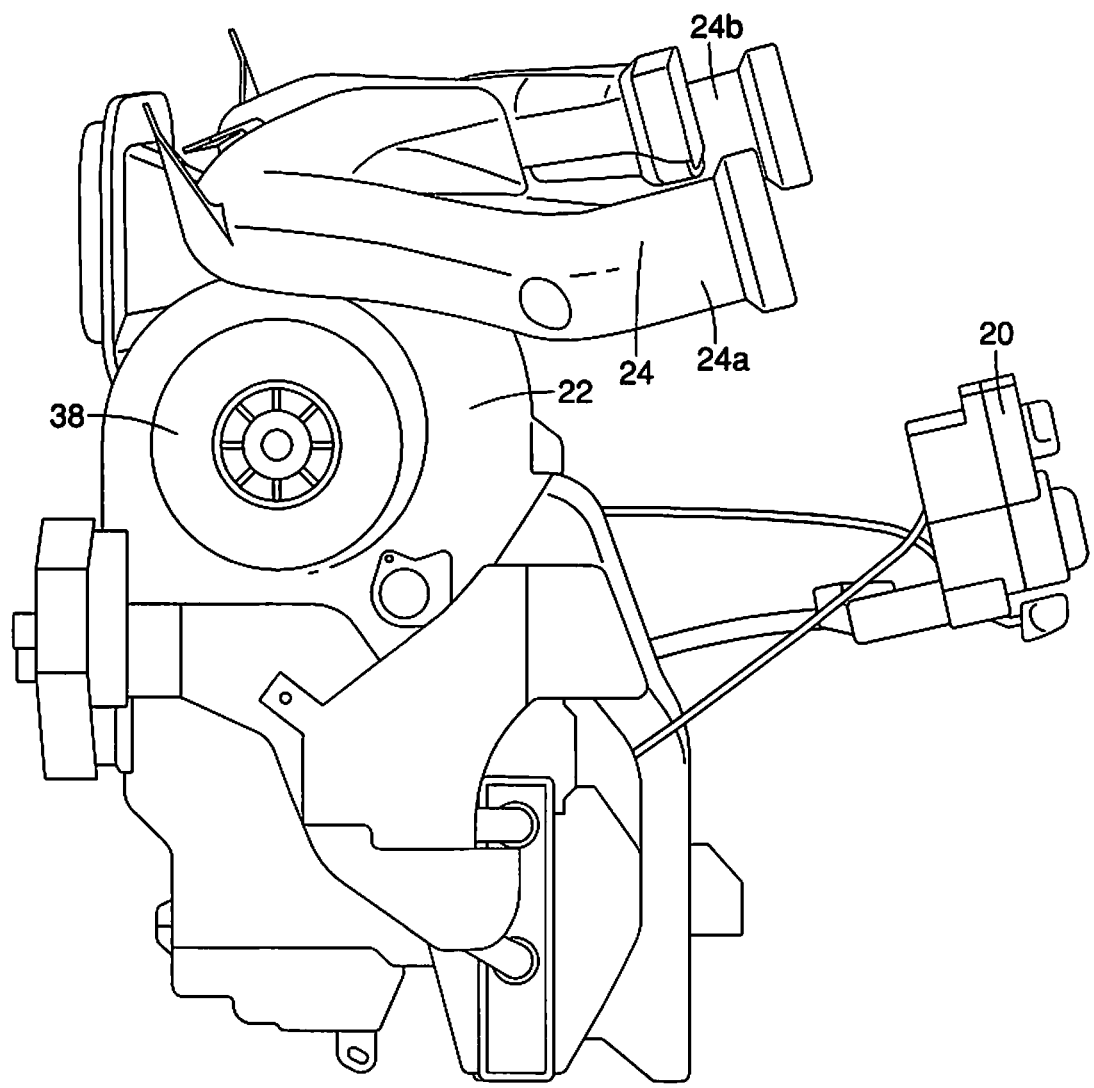
FIG. 5 a side view of the HVAC system shown removed from the vehicle, showing an air handler and the air duct in accordance with the first embodiment.

The controller 20 includes a display on the instrument panel 14, as shown in FIGS. 2, 3 and 5. The display of the controller 20 is configured to receive HVAC operating selections from a driver or passenger within the passenger compartment 14 of the vehicle 10 in a conventional manner. The controller 20 controls operation of the compressor (not shown), the refrigerant expansion device (not shown), a heater core (not shown) and vent doors 30, 32 and 34 (FIG. 6) in response to the HVAC operating selections inputted via the display in a conventional manner. Although not shown, the refrigerant expansion device, the heater core and the evaporator are all installed within the air handler 22 in a conventional manner.

The air handler 22 (FIGS. 4-6) includes a fan or blower 38 that moves air through the air handler 22, the heater core (not shown), the evaporator (not shown) and through the air duct 24 in a conventional manner. The blower 38 is installed to the air handler 22 and is configured selectively operate at a plurality of air blowing speeds to generate airflow through the air handler 22 in response to selections made via the controller 20.

Figure 6:
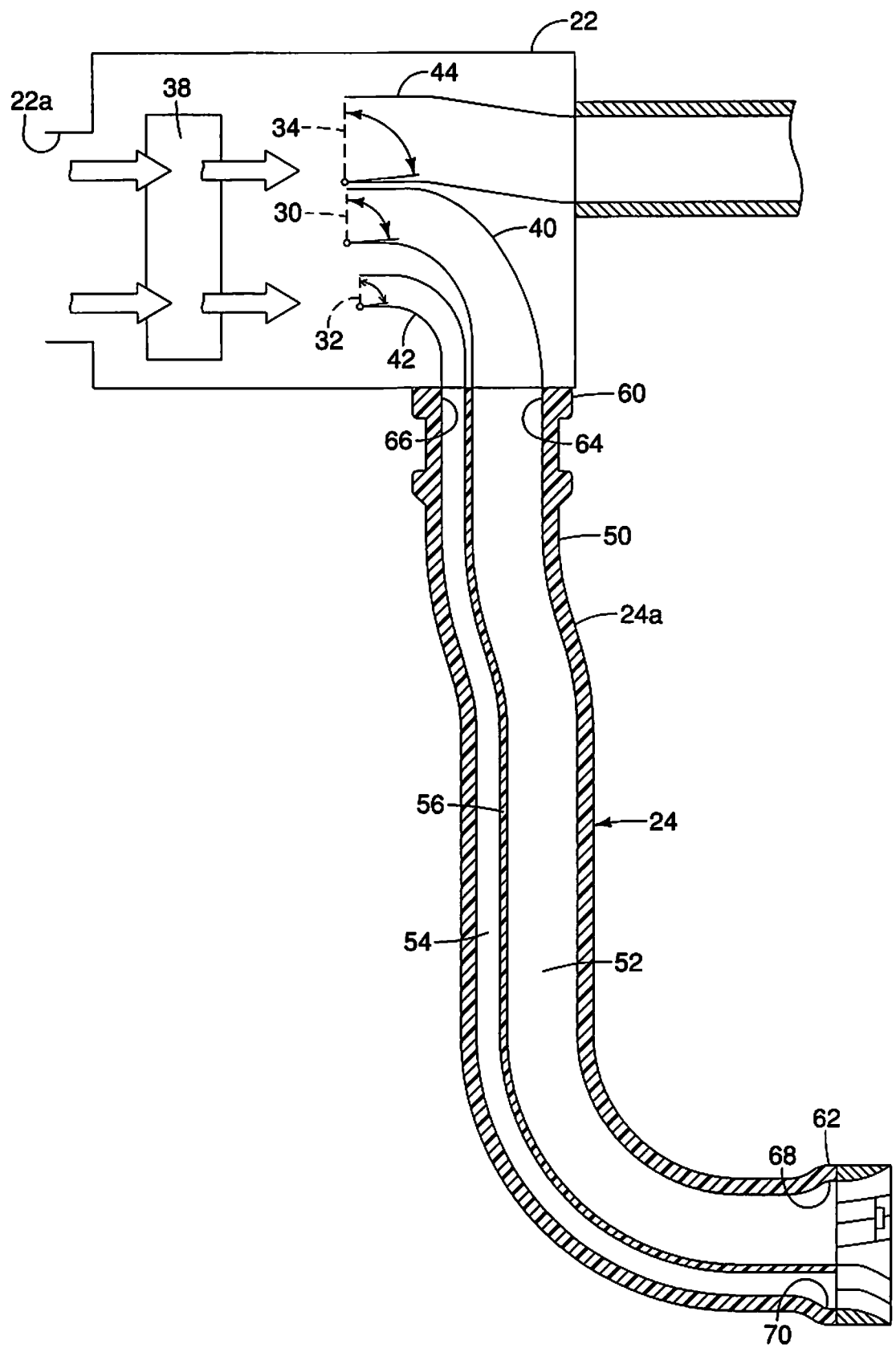
FIG. 6 is a schematic top view showing a portion of the air handler and the air duct in accordance with the first embodiment.
Figure 7:
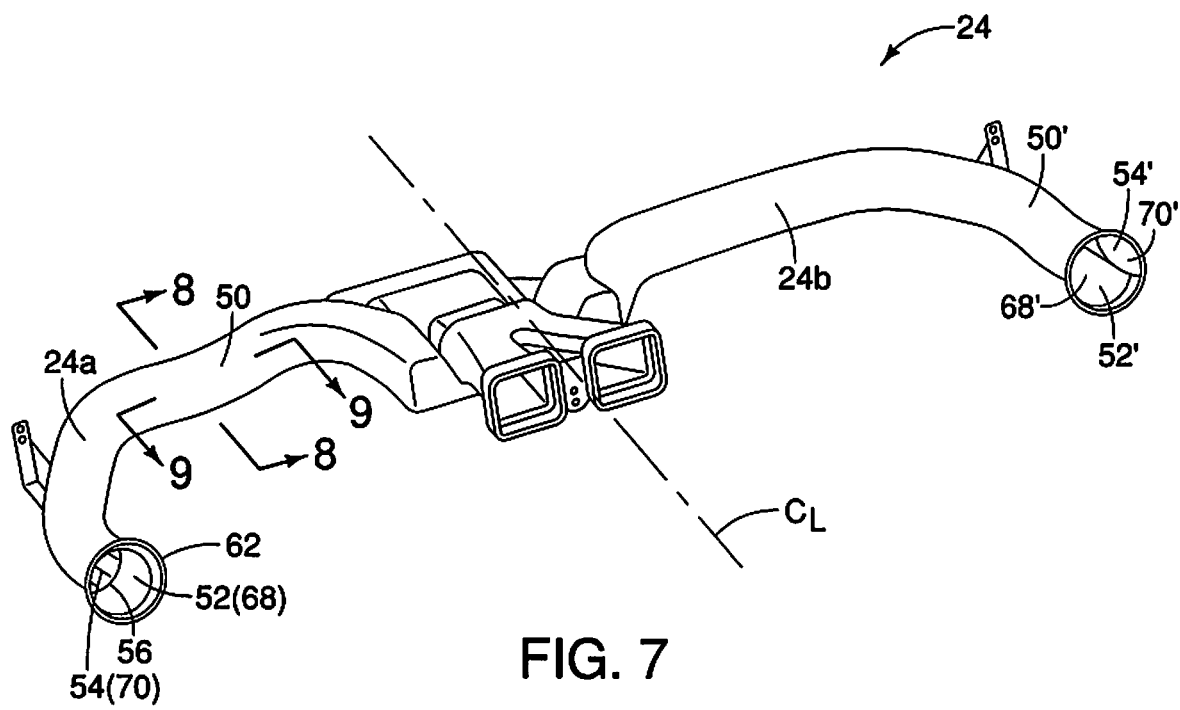
FIG. 7 is a perspective view of the air duct shown removed from the air handler in accordance with the first embodiment.

As shown schematically in FIG. 6, the air handler 22 includes an air inlet 22a, airflow direction control mechanisms 22b, 22c and 22d that are configured to selectively direct airflow out of the air handler 22 to any of a plurality of outlets, such as a first outlet 40, a second outlet 42 and a third outlet 44, or simultaneously to any two or all, of the first outlet 40, the second outlet 42 and the third outlet 44. It should be understood from the drawings and the description herein that the air handler 22 can be provided with several inlets, such as a recirculation air inlet and a fresh air inlet. Further the air handler 22 can be provided with additional outlets, such as a floor vent outlets (not shown), windshield defogger vent outlets (not shown), and is not limited to having only three outlets, such as the first outlet 40, the second outlet 42 and the third outlet 44.

The air handler 22, the blower 38, the air duct 24 and the vent assemblies 26 and 26' are configured to install to the instrument panel 16 within the passenger compartment 14 of a vehicle 10. For example, the air handler 22 can be at least partially covered and/or concealed by the instrument panel 16. The air duct 24 is installed to the instrument panel 16 to provide air flow to the vent assemblies 26 and 26'. The vent assemblies 26 and 26' are installed to openings at opposite sides of the instrument panel 16 such that the vent assembly 26 is adjacent to the driver's side window $W_D$ and the vent assembly 26' is located adjacent to the passenger's side window $W_P$.

As shown in FIG. 6, the air handler 22 includes the vent door 30 is installed at the first outlet 40 and is movable between and open orientation (solid line) and a closed orientation (dashed line). Similarly, the vent door 32 is installed at the second outlet 42 and is movable between and open orientation (solid line) and a closed orientation (dashed line). Further, the vent door 34 is installed at the third outlet 44 and is movable between and open orientation (solid line) and a closed orientation (dashed line). As mentioned above, the vent doors 30, 32 and 34 are operated (moved) via control signals from the controller 20. Operation of the vent doors 30, 32 and 34 provides control of the air flow out of the air handler 22. It should be understood from the drawings and the description herein that the air handler 22 includes additional vent doors (not shown). For purposes of understanding the invention described herein, only the vent doors 30, 32 and 34, and the first, second and third outlets 40, 42 and 44 are described.

A description is now provided for the air duct 24 with specific reference to FIGS. 4-15. The air duct 24 is attached to the air handler 22 such that air flow is selectively directed to flow through the various portions of the air duct 24, as described below.

As shown in FIGS. 7 and 12-15, the air duct 24 has a first section 24a and a second section 24b. The first section 24a and the second section 22a. Functionally, the first section 24a and the second section 24b are identical except that they are approximately symmetrically arranged relative to one another about a center line $C_L$. There are minor differences between the first section 24a and the second section 24b and the second section 24b, but they function and are constructed and arranged in an approximately identical manner. In the following description of the air duct 24, those features common to both the first section 24a and the second section 24b are given identical reference characters. Hence, description of one of the first section 24a and the second section 24b applies equally to the other of the first section 24a and the second section 24b, except where those differences are provided with separate descriptions.

The first section 24a of the air duct 24 is shown schematically in FIG. 6 connected to the air handler 22. The first section 24a of the air duct 24 basically includes a tubular housing 50 that partially defines and completely surrounds both a first airflow path 52 and a second airflow path 54. The second airflow path 54 is separated from the first airflow path 52 by a wall 56 extending therebetween. The wall 56 extends the entire length of the tubular housing 50. In the schematic representation in FIG. 6, the first section 24a of the air duct 24 includes a first end 60 and a second end 62. The first end 60 of the tubular housing 50 defines a first air inlet 64 and a second air inlet 66. The second end 62 defines a first air outlet 68 and a second air outlet 70.

As shown in FIG. 6, relative to the air duct 24, the first air inlet 64 is in fluid communication with only the first airflow path 52. Further, relative to the air duct 24, the second air inlet 66 is in fluid communication with only the second airflow path 54. More specifically, the first airflow path 52 and the second airflow path 54 are separated from one another and are not in fluid communication with one another within the air duct 24.

Similarly, relative to the air duct 24, the first air outlet 68 is in fluid communication with only the first airflow path 52. Further, relative to the air duct 24, the second air outlet 70 is in fluid communication with only the second airflow path 54. The first air inlet 64 and the second air inlet 66 are adjacent to one another at the first end 60 of the tubular housing 50. Further, the first air outlet 68 and the second air outlet 70 are adjacent to one another at the second end 62 of the tubular housing 50. The first air inlet 64 is in direct fluid communication with the first outlet 40 of the air handler 22. The second air inlet 66 is in direct fluid communication with the second outlet 42 of the air handler 22. Hence, when airflow is directed out of the air handler 22 via the first outlet 40, air is only supplied to the first airflow path 52. Further, when airflow is directed out of the air handler 22 via the second outlet 42, air is only supplied to the second airflow path 54.

Figure 8:
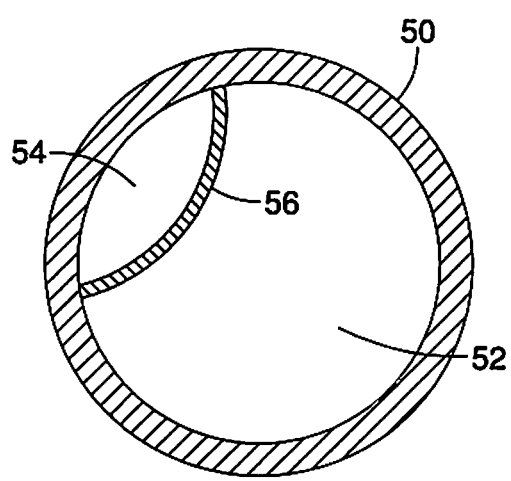
FIG. 8 is a cross-sectional view of a portion of the air duct taken along the line 8-8 in FIG. 7 in accordance with the first embodiment.

The tubular housing 50 of the air duct 24 is an elongated structure having an overall circular shape in cross-section, as shown in FIG. 8. As is also shown in FIG. 8, the first airflow path 52 occupies at least 50% of an overall cross-sectional area of the tubular housing 50. However, in the depicted embodiment, the first airflow path 52 occupies approximately 75% of an overall cross-sectional area of the tubular housing 50 with the second airflow path 54 occupying a remainder of the overall cross-sectional area of the tubular housing 50 or approximately 25% of an overall cross-sectional area of the tubular housing 50.

Figure 9:
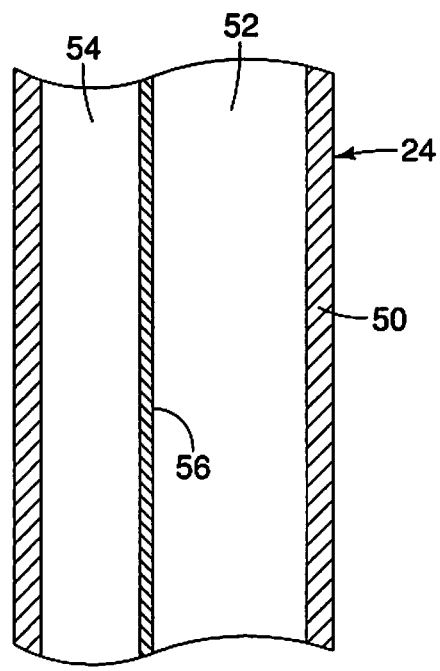
FIG. 9 is a cross-sectional view of another portion of the air duct taken along the line 9-9 in FIG. 7 in accordance with the first embodiment.
Figure 10:
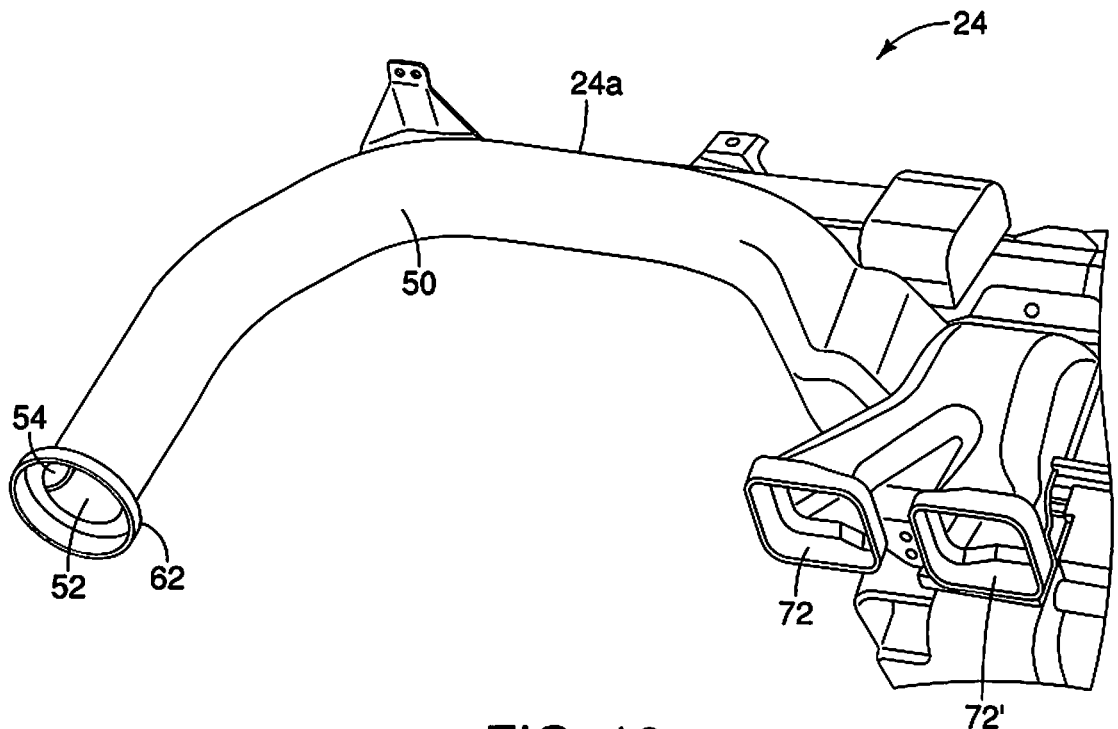
FIG. 10 is a perspective view of a portion of the air duct in accordance with the first embodiment.
Figure 11:
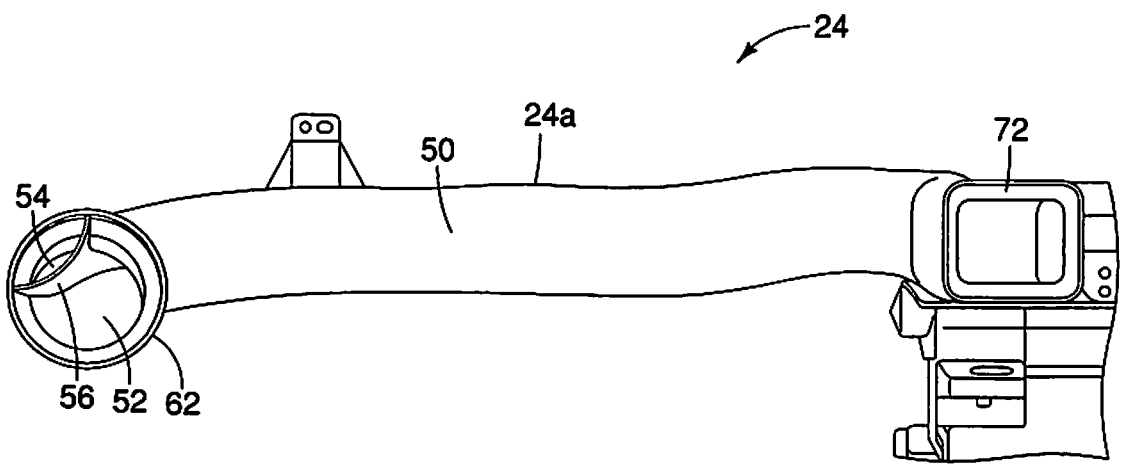
FIG. 11 is a rear view of a portion of the air duct (looking forward from a point of view relative to the passenger compartment) shown removed from the vehicle in accordance with the first embodiment.

As shown in FIG. 9, the wall 56 extends between the first airflow path 52 and the second airflow path 54, thereby completely separating them. Further, the wall 56 extends the entire length of each of the first airflow path 52 and the second airflow path 54.

As mentioned above, the air duct 24 further includes the second section 24b that is similar, or nearly identical to the first section 24a, with mirror image symmetry. The second section 24b also includes a second tubular housing 50' that defines a third airflow path 52' and a fourth airflow path 54' separated by a wall 56'. The second tubular housing 50' defines and surrounds both the third airflow path 52' and the fourth airflow path 54' that is separate and independent of the third airflow path 52' in a manner consist with the tubular housing 50 of the first section 24a. Further, the second tubular housing 50' defines a third end 60' (FIG. 13) that includes a third air inlet 64' (FIG. 13) in fluid communication with only the third airflow path 52' and a fourth air inlet 66' (FIG. 13) in fluid communication with only the fourth airflow path 54'. The second tubular housing 50' has a fourth end 62' that includes a third air outlet 68' in fluid communication with only the third airflow path 52' and a fourth air outlet 70' in fluid communication with only the fourth airflow path 54'.

Figure 12:
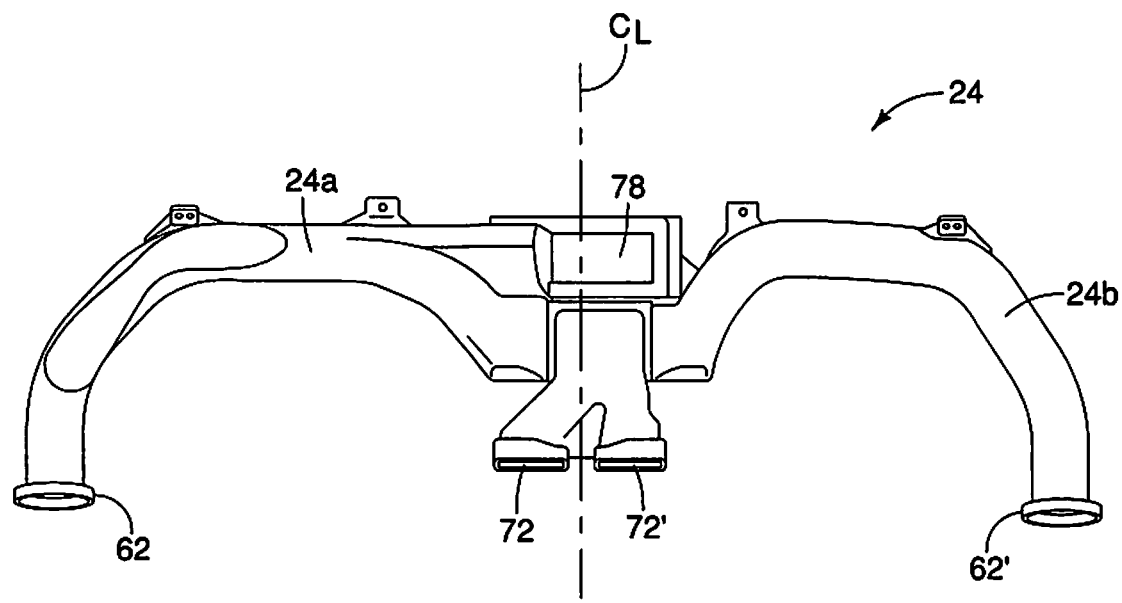
FIG. 12 is a top view of the air duct in accordance with the first embodiment.
Figure 13:
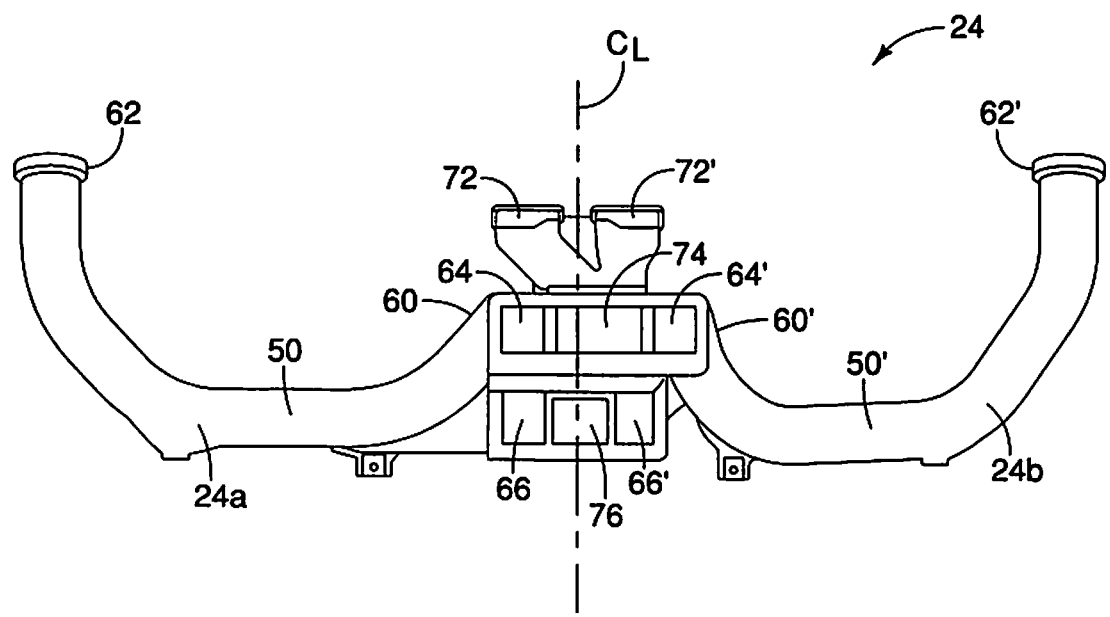
FIG. 13 is a bottom view of the air duct in accordance with the first embodiment.
Figure 14:
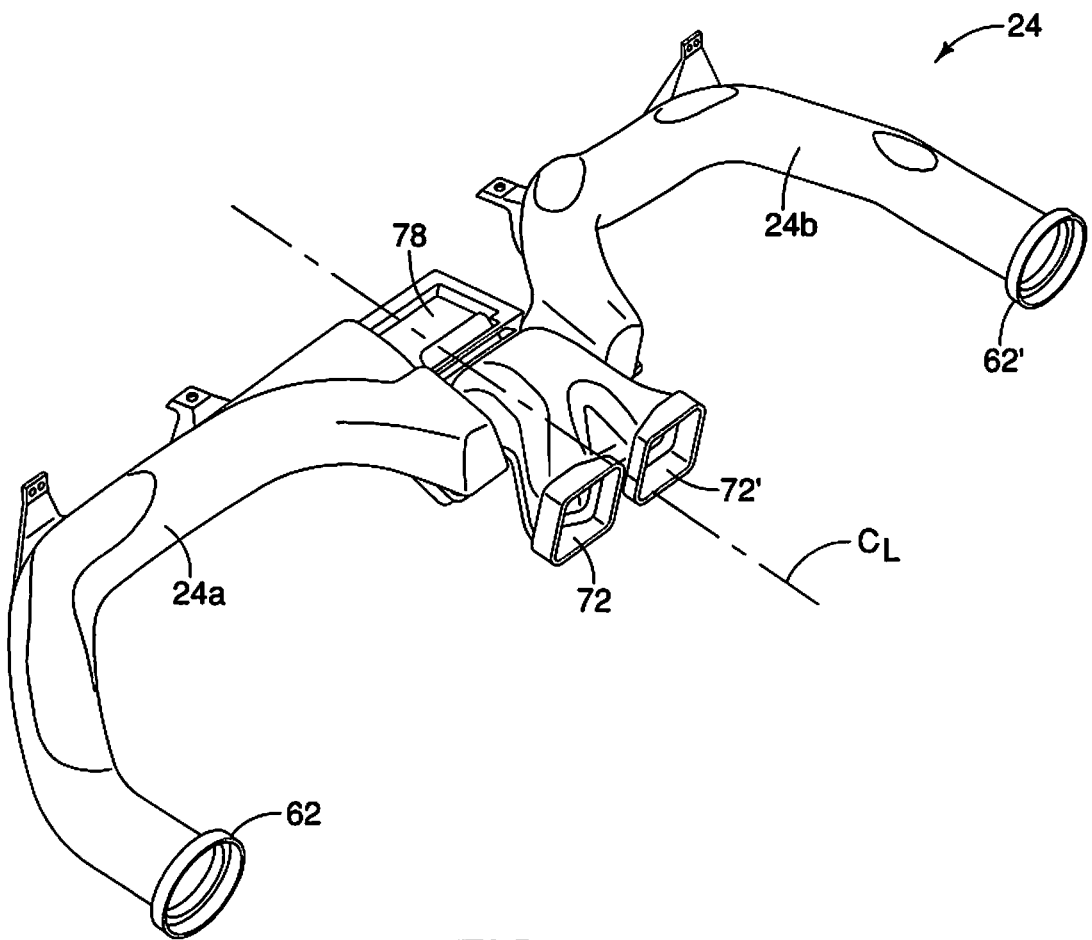
FIG. 14 is a perspective rear view of the air duct in accordance with the first embodiment.
Figure 15:
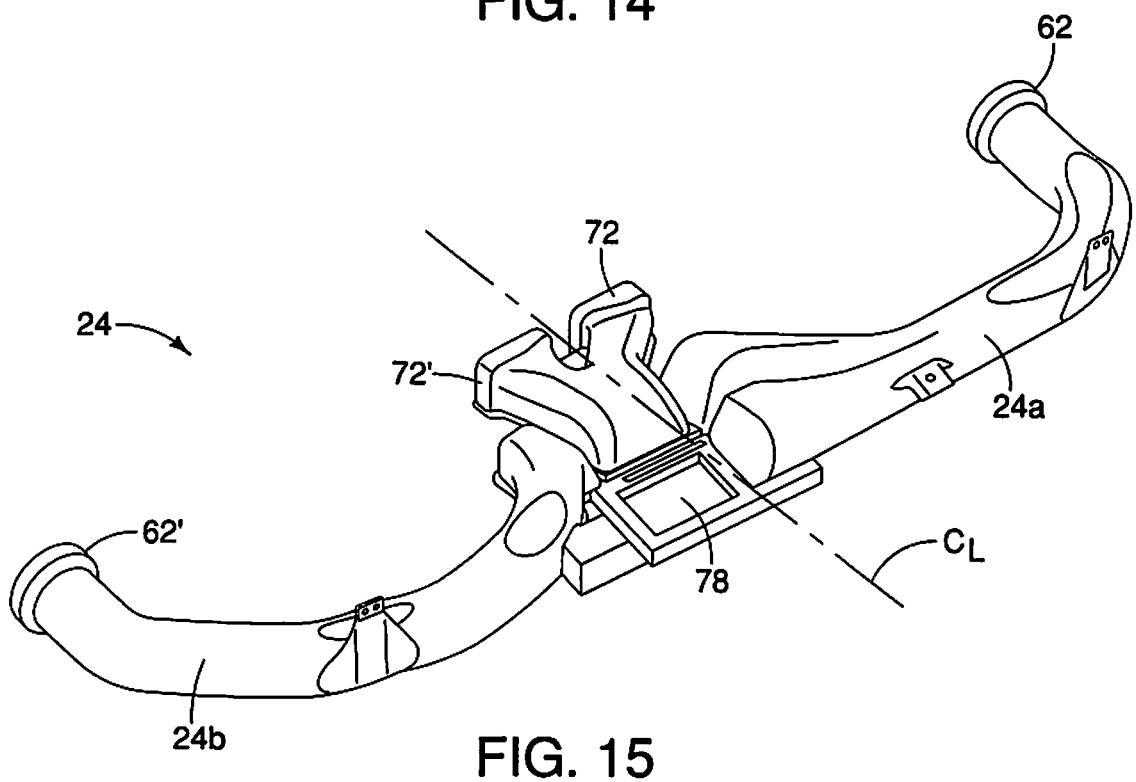
FIG. 15 is a perspective front view of the air duct in accordance with the first embodiment.

As shown in FIGS. 7 and 10-15, the air duct 24 can also include a pair of center vent outlets 72 and 72'. The center vent outlets 72 and 72' are positioned and configured to supply airflow from the air handler 22 to vents in a central area of the instrument panel 14 in a conventional manner. The center vent outlets 72 and 72' supplied by airflow from the air handler 22 via a center vent inlet 74 shown in FIG. 13. Although not shown, the air handler 22 supplies airflow to windshield defogger vents that are supplied by airflow from the air handler 22 via a windshield vent inlet 76 (FIG. 13) and exhaust air via a windshield vent outlet 78 (FIGS. 12 and 14-15). It should be understood from the drawings and the description herein that the air duct 24 can be formed with an air passageway (not shown) that extends from the center vent inlet 74 to each of the center vent outlets 72 and 72', and can further be formed with another air passageway (not shown) that extends from the windshield inlet 76 to each of the windshield vent outlet 78.

Referring again to FIG. 13, the first end 60 of the tubular housing 50 and the third end 60' of the second tubular housing 50' extend toward one another in a central portion of the air duct 24. Specifically, the first end 60 of the tubular housing 50 and the third end 60' of the second tubular housing 50' are proximate or adjacent to one another. Further, the first and third air inlets 64 and 64' are adjacent to one another with the center vent inlet 74 located therebetween, and the second and fourth air inlets 66 and 66' are also proximate or adjacent to one another with the windshield vent inlet 78 located therebetween.

The second end 62 of the tubular housing 50 defines a distal end of the first section 24a of the air duct 24. Further, the second end 62' of the second tubular housing 50' defines a distal end of the second section 24b of the air duct 24. The distal end of the second end 62 and the distal end of the second end 62' define opposite ends of the air duct 24.

Figure 16:
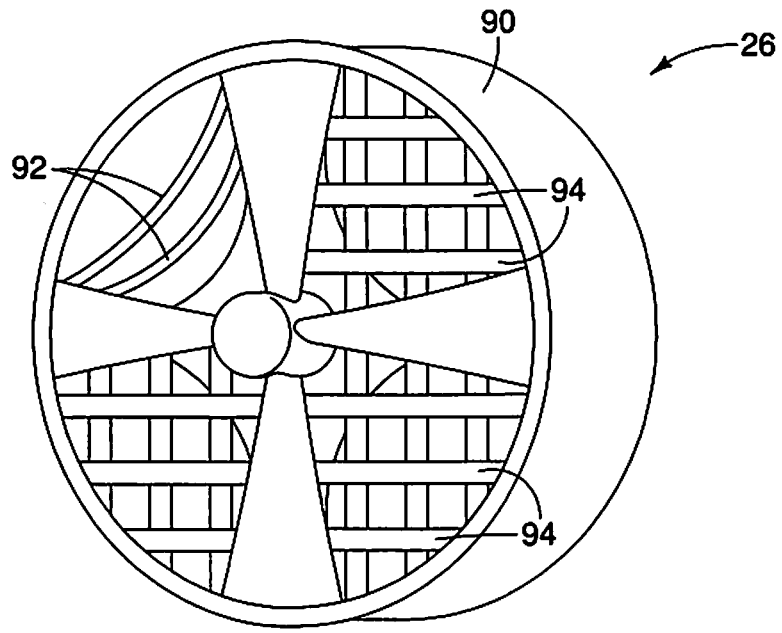
FIG. 16 is a schematic perspective view of a first one of the vent assemblies shown removed from the vehicle in accordance with the first embodiment.
Figure 17:
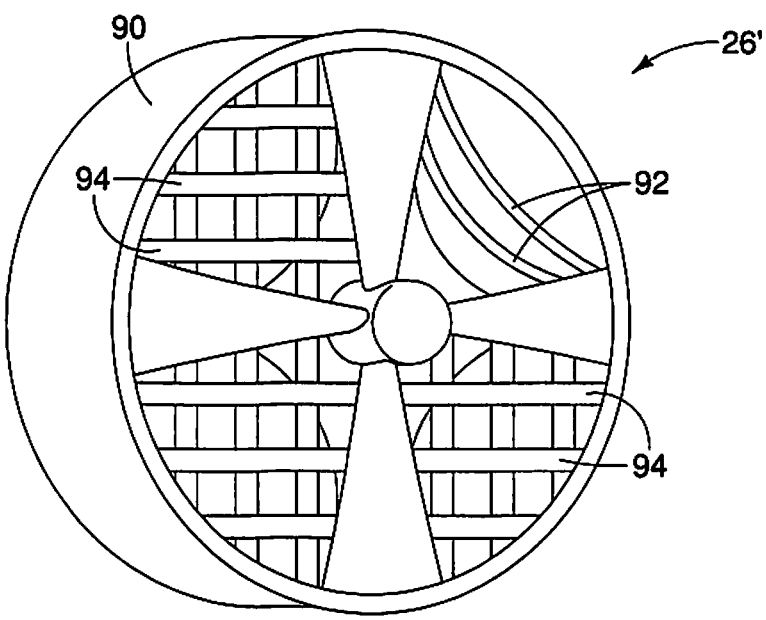
FIG. 17 is a schematic perspective view of a second one of the vent assemblies shown removed from the vehicle in accordance with the first embodiment.
Figure 18:
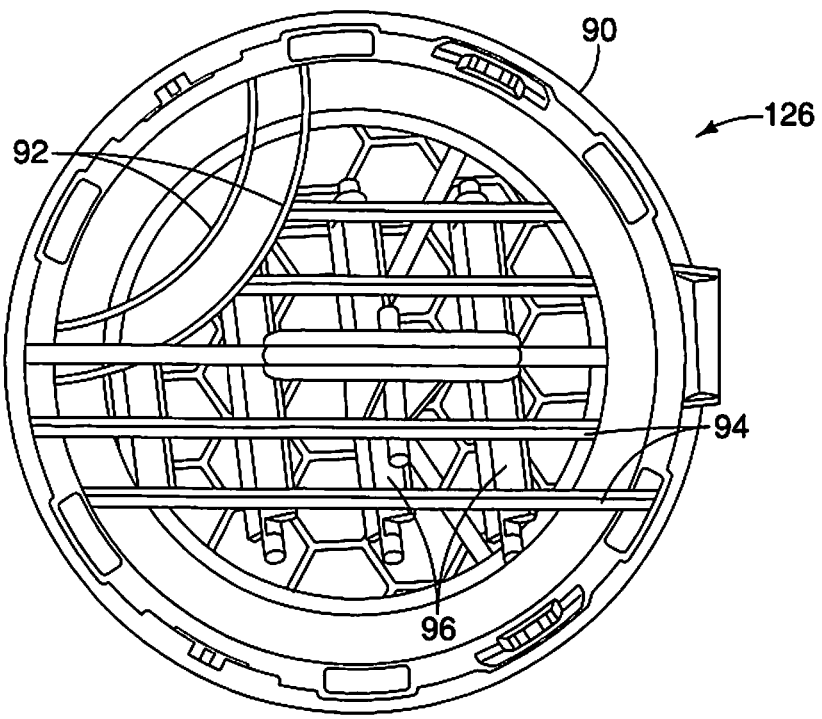
FIG. 18 is a plan view of the first one of the vent assemblies shown removed from the vehicle in accordance with the first embodiment.
Figure 19:
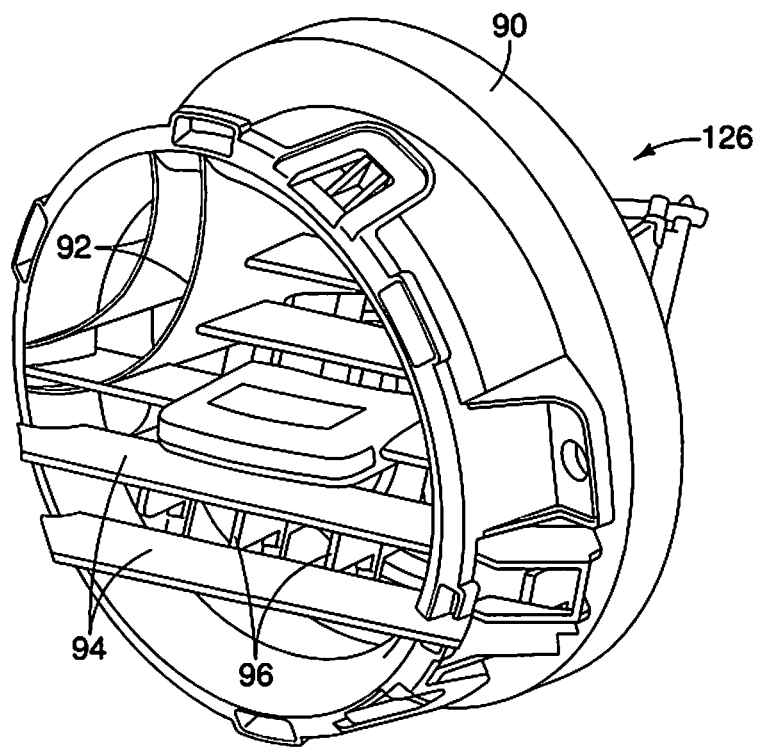
FIG. 19 is a perspective view of the first one of the vent assemblies shown removed from the vehicle in accordance with the first embodiment.

The vent assemblies 26 and 26' will now be described with specific reference to FIGS. 16-19. In FIGS. 16 and 17 the vent assemblies 26 and 26' are shown schematically demonstrating the structural relationship between the various parts of the vent assemblies 26 and 26'. In FIGS. 18 and 19, only the vent assembly 26 is shown, but with additional detail as compared to FIG. 16. The vent assembly 26 and 26' in the first embodiment are identical to one another, except that they are mirror images of one another (symmetrical with respect to one another).

Since the vent assemblies 26 and 26' are basically the same, description of one applies equally to both. Therefore, only the vent assembly 26 will be described for the sake of brevity.

The vent assembly 26 has a housing 90 having an overall circular shape that supports and surrounds a first set of airflow directing members 92 (also referred to as first airflow directing members) and a second set of air flow directing members 94 (also referred to as second airflow directing members). The vent assembly 26 is installed to the second end 62 of the tubular housing 50 and/or to the instrument panel 14 within an opening formed in the instrument panel 14 located and dimensioned specifically for the vent assembly 16. The first airflow directing members 92 are fixed in place and are shaped and aimed to direct airflow from the first air outlet 68 of the tubular housing 50 in a first direction $D_1$ (FIGS. 2 and 3) away from the tubular housing 50 and to the driver's side window $W_D$. The second airflow directing members 94 direct airflow from the tubular housing 50 in at least a second direction $D_2$ (FIG. 3) away from the tubular housing 50 and into the passenger compartment 14.

As shown in FIGS. 18 and 19, the vent assembly 26 are configured such that the first airflow directing members 92 are fixed in place (non-movably fixed in place), and the second airflow directing members 94 are configured to pivot in order to aim the airflow therefrom relative to vertical directions. Further, the vent assembly 26 can include third airflow directing members 96 that are configured to pivot in order to aim the airflow therefrom relative to lateral directions.

The configuration of the air duct 24 and the vent assembly 26 are such that a single air duct 24 provides two separate and independent airflow paths, the first airflow path 52 and the second airflow path 54. More specifically, the configuration of the air duct 24 and the vent assembly 26 are such that airflow for defogging the driver's side window $W_D$ can be controlled via the air handler 22 through the first airflow directing members 92 separately and independently from the air flow provided to the second and third airflow directing members 94 and 96.

The airflow from the air handler 22 to the first airflow path 52 only reaches the second and third airflow directing members 94 and 96 of the vent assembly 26. Further, the airflow from the air handler 22 to the second airflow path 54 only reaches the first airflow directing members 92 of the vent assembly 26 and is directed at the driver's side window $W_D$. The air duct 24 is configured such that airflow through the first airflow path 52 is completely segregated and separated from the airflow passing through the second airflow path 54 by the wall 56.

It should be understood from the drawings and the description herein that the air duct 24 can include only the first section 24a of the air duct 24, as depicted schematically in FIG. 6. Alternatively, the air duct 24 can include the first section 24a and the second section 24b thereby defining the air duct 24 (an air duct assembly) described above.

The air duct 24 can be made up of a variety of components, and segments joined together to define the above structure or can be made as a single monolithic element formed by injection molding processes, three-dimensional printing techniques or other similar manufacturing techniques.

Second Embodiment

Figure 20:
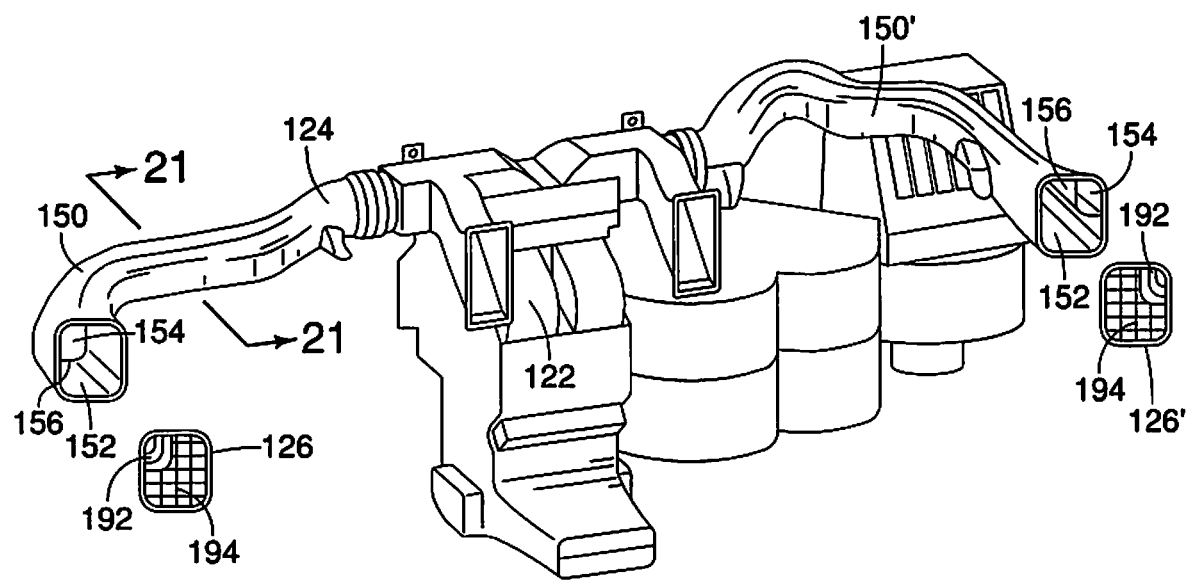
FIG. 20 is a perspective view of an air handler and a duct assembly shown removed from the vehicle in accordance with a second embodiment.
Figure 21:
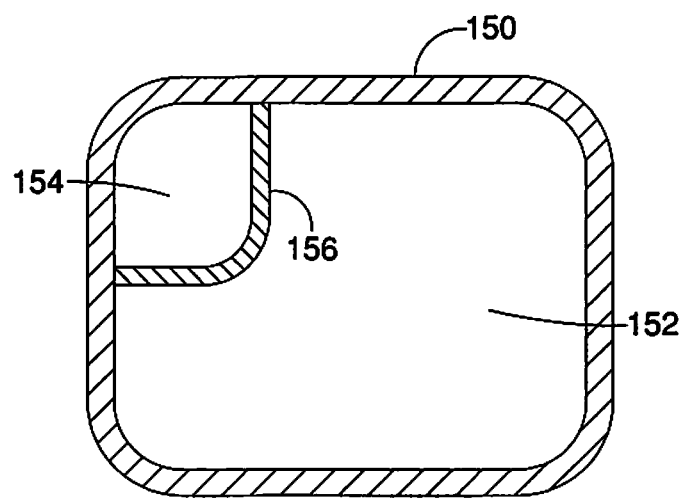
FIG. 21 is a cross-sectional of a portion of the air duct taken along the line 21-21 in FIG. 20, in accordance with the second embodiment.

Referring now to FIGS. 20 and 21, an air handler 122, an air duct 124 and vent assemblies 126 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the air handler 122 is basically identical to that described above in the first embodiment. Therefore, for the sake of brevity, description of the air handler 122 is omitted.

In the second embodiment, the air duct 124 replaces the air duct 24, but has many similar features. Specifically, the air duct 124 includes tubular housings 150 and 150'. The tubular housings 150 and 150' are identical, except that they are mirror images of one another. Description of one of the tubular housings 150 and 150' therefore applies equally to both. The tubular housing 150 defines a first airflow path 152 and a second airflow path 154 in a manner similar to the first airflow path 52 and the second airflow path 54 of the first embodiment. Specifically, the first airflow path 152 and the second airflow path 154 are kept segregated and separated from one another by a wall 156 that extends the entire length of the tubular housing 150.

The main difference between the tubular housing 50 of the first embodiment and the tubular housing 150 of the second embodiment is that in the first embodiment, the tubular housing 50 has a round or elliptical shape, as viewed in cross-section. The tubular housing 150 of the second embodiment has a square shape or rectangular shape as viewed in cross-section in FIG. 21.

The vent assembly 126, like the tubular housing 150, has a square shape or rectangular shape as shown in FIG. 20. The vent assembly 126 includes first airflow directing members 192 and at least second airflow directing members 194. The first airflow directing members 192 are fixed in place and are shaped and oriented to direct defogging airflow from the second airflow path 154 to an adjacent side or door window surface within the vehicle 10. The second airflow directing members 194 are movable and direct airflow from the first airflow path 152 in various directions to areas of the passenger compartment of the vehicle 10.

Third Embodiment

Figure 22:
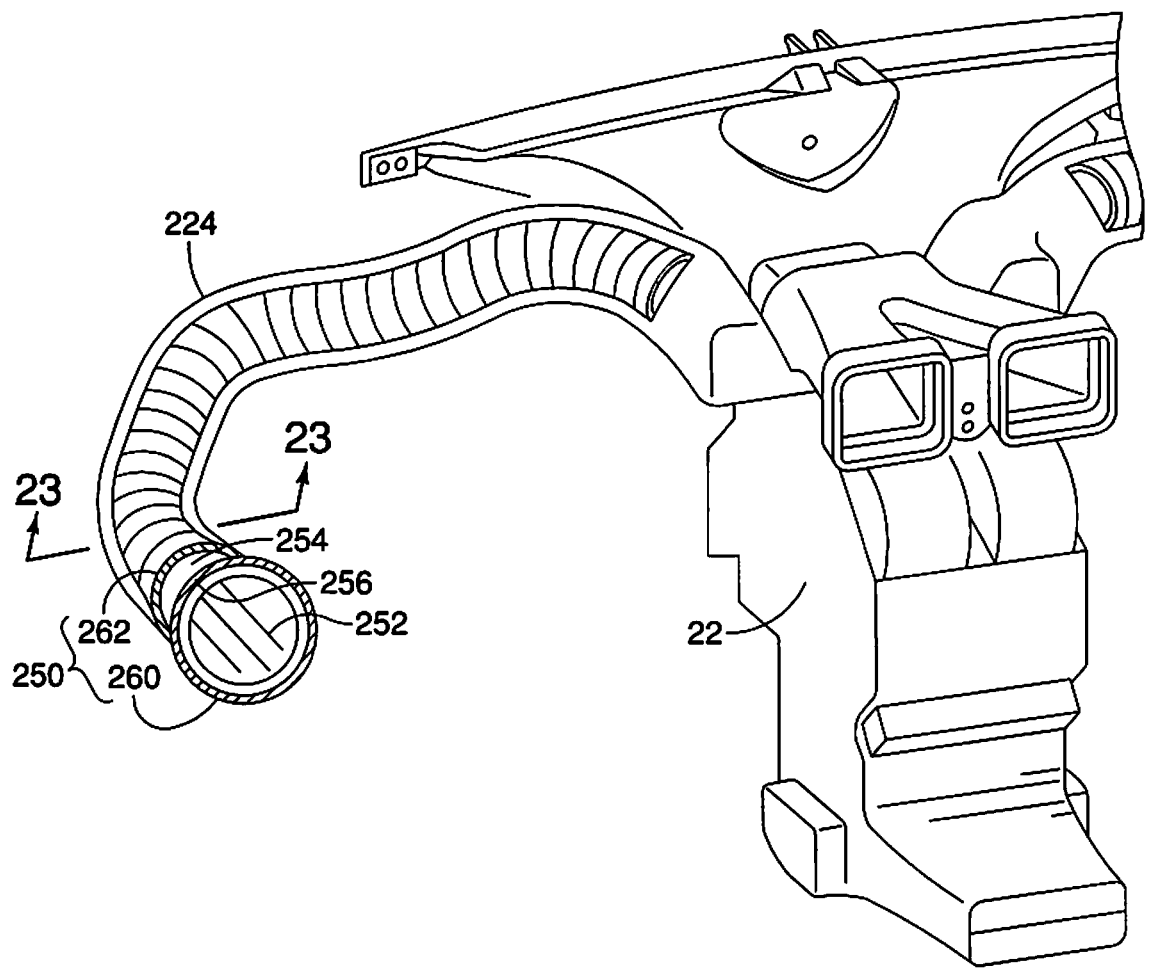
FIG. 22 is a perspective view of a portion of an air handler and a portion of an air duct in accordance with a third embodiment.
Figure 23:
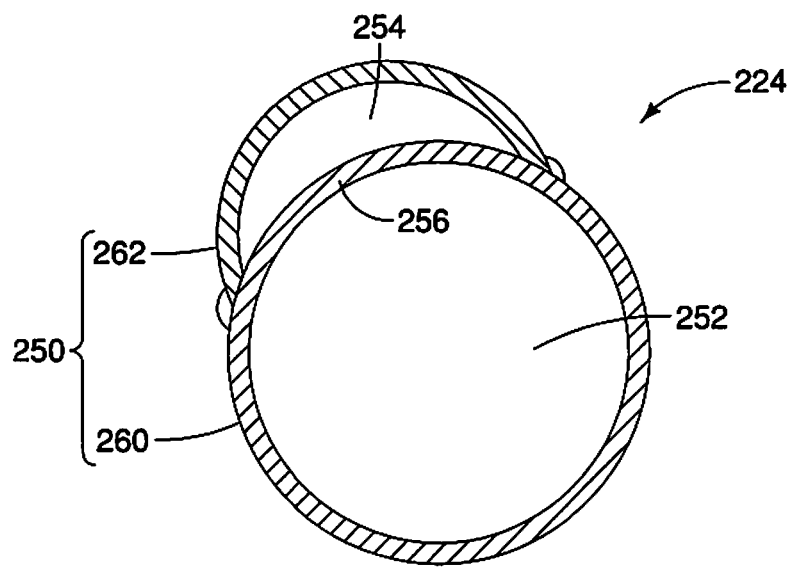
FIG. 23 is a cross-sectional view of the air duct taken along the line 23-23 in FIG. 22 in accordance with the third embodiment.

Referring now to FIGS. 22 and 23, an air duct 224 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the air duct 224 is attached to the air handler 22. The air handler 22 is basically identical to that described above in the first embodiment. Therefore, for the sake of brevity, description of the air handler 22 is omitted.

In the third embodiment, the air duct 224 replaces the air duct 24 of the first embodiment. Specifically, the air duct 224 includes a tubular housing 250. The tubular housing 250 defines a first airflow path 252 and a second airflow path 254 in a manner similar to the first airflow path 52 and the second airflow path 54 of the first embodiment. The tubular housing 250 includes an oval tube section 260 and an arcuate member 262. In the third embodiment, the first airflow path 252 is defined by the oval tube section 260. The oval tube section 260 is round, but can have an elliptical shape. The arcuate member 262 is attached to an outer surface of the oval tube section 260 via, for example, adhesives or welding techniques. The arcuate member 262 and a portion 256 of the outer surface of the oval tube section 260 define the second airflow path 254. The portion 256 of the outer surface of the oval tube section 260 defines a wall that separates the first airflow path 252 from the second airflow path 254.

Fourth Embodiment

Figure 24:
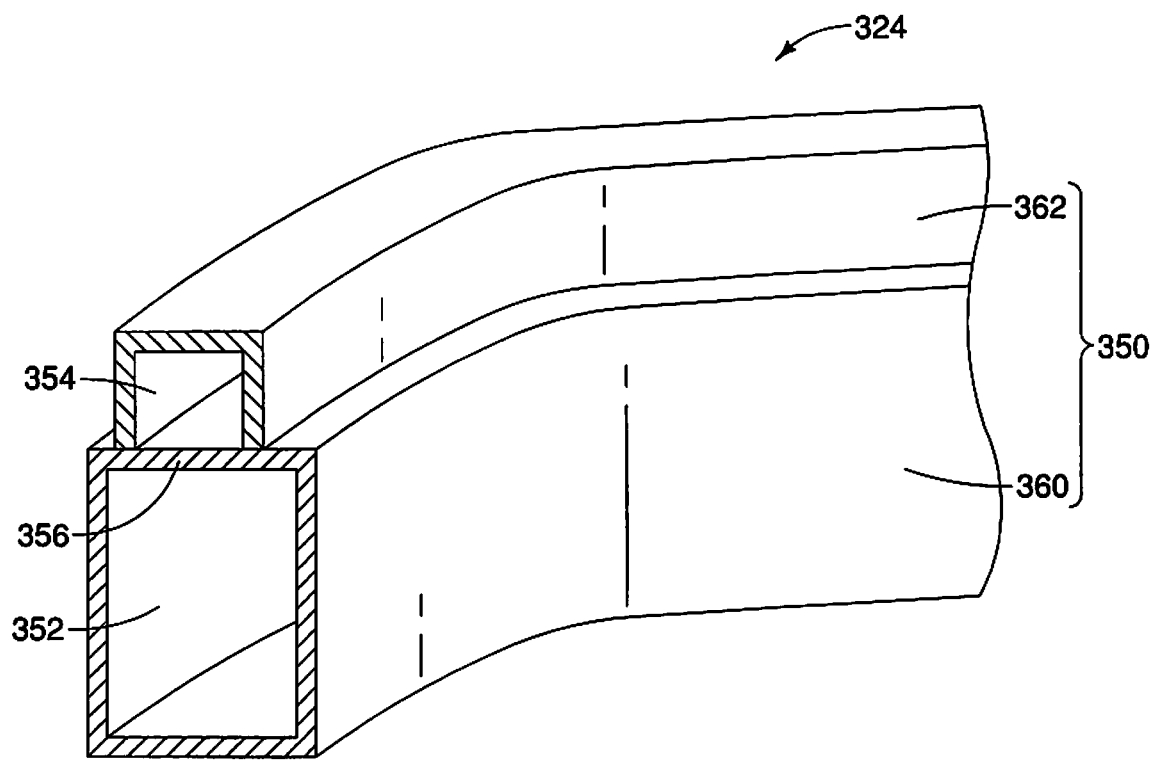
FIG. 24 is a perspective view of a portion of an air duct in accordance with a fourth embodiment.

Referring now to FIG. 24, an air duct 324 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the air duct 324 is attached to an air handler (not shown). In the fourth embodiment, the air duct 324 replaces the air duct 24 of the first embodiment. Specifically, the air duct 324 includes a tubular housing 350. The tubular housing 350 defines a first airflow path 352 and a second airflow path 354 in a manner similar to the first airflow path 52 and the second airflow path 54 of the first embodiment. However, in the fourth embodiment, the tubular, housing 350 includes a first tube section 360 and a second tube section 362. Both the first tube section 360 and the second tube section 362 have rectangular or square shapes, as shown in cross-section in FIG. 24. The first airflow path 352 is defined by the tube section 360 and the second airflow path 354 is defined by the second tube section 362. The second tube section 362 is attached to an outer surface of the first tube section 360 via, for example, welding techniques. A portion 356 of the outer surface of the first tube section 360 defines a wall that separates the first airflow path 352 from the second airflow path 354.

The controller 20 of the HVAC system 18 preferably includes a microcomputer with an HVAC system 18 control program that controls the various components as discussed below. The controller 20 can also include other conventional components such as an input interface circuit, an output interface circuit, and storage devices such as a ROM (Read Only Memory) device and a RAM (Random Access Memory) device. The memory circuit stores processing results and control programs such as ones for HVAC operation that are run by the processor circuit. The controller 20 is operatively coupled to the components of the HVAC system 18 in a conventional manner. The internal RAM of the controller 20 stores statuses of operational flags and various control data. The internal ROM of the controller 20 stores the HVAC system 18 commands and electronic protocols for various operations. It will be apparent to those skilled in the art from this disclosure that the precise structure and algorithms for the controller 20 can be any combination of hardware and software that will carry out the functions of the present invention.

The various elements of the vehicle 10 (other than the air handler 22, the air duct 24 and the vent assembly 26 are conventional components that are well known in the art. Since such vehicle elements are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the HVAC system. Accordingly, these terms, as utilized to describe the present invention should be interpreted relative to a vehicle equipped with the HVAC system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. An HVAC system comprising:
an air handler having an air inlet, an airflow direction control mechanism configured to selectively direct airflow out of the air handler to a first outlet or a second outlet, or simultaneously to both the first outlet and the second outlet;
a blower coupled to the air handler selectively operable at a plurality of blowing speeds to generate airflow through the air handler;
an air duct connected to the air handler and having a tubular housing defining and completely surrounding both a first airflow path and a second airflow path from a first end of the tubular housing of the tubular housing to a second end of the tubular housing, the second air flow path being separate from the first airflow path, the first end of the tubular housing defining a first air inlet in fluid communication with only the first airflow path and a second air inlet in fluid communication with only the second airflow path, the second end of the tubular housing defining a first air outlet in fluid communication with only the first airflow path and a second air outlet in fluid communication with only the second airflow path, the first air inlet and the second air inlet being adjacent to one another at the first end of the tubular housing and the first air outlet and the second air outlet being adjacent to one another at the second end of the tubular housing, the first air inlet being in direct fluid communication with the first outlet of the air handler and the second air inlet being in direct fluid communication with the second outlet of the air handler; and a vent assembly having a housing that surrounds both first airflow directing members and second airflow directing members, the vent assembly being installed to the tubular housing at the second end of the tubular housing such that the first airflow directing members direct airflow from the first air outlet in a first direction away from the tubular housing and the second airflow directing members direct airflow from the second air outlet in at least a second direction away from the tubular housing.

2. The HVAC system according to claim 1, wherein the first airflow directing members of the vent assembly are non-movably fixed to the housing of the vent assembly, and the second airflow directing members are movable within the housing such that airflow from the second air outlet is adjustable to any of a plurality of directions including the second direction.

3. The HVAC system according to claim 2, wherein the air handler, the blower, the air duct and the vent assembly are configured to install to an instrument panel in a passenger compartment of a vehicle such that the first airflow directing members of the vent assembly are fixedly positioned to direct air against a side window of the vehicle and the second airflow directing members of the vent assembly are adjustably positionable to direct airflow into the passenger compartment away from the side window of the vehicle.

4. The HVAC system according to claim 1, wherein the tubular housing of the air duct is an elongated structure having a circular shape in cross-section.

5. The HVAC system according to claim 4, wherein the housing of the vent assembly has an overall circular shape.

6. The HVAC system according to claim 1, wherein the tubular housing of the air duct is an elongated structure having a rectangular shape in cross-section.

7. The HVAC system according to claim 6, wherein the housing of the vent assembly has an overall rectangular shape.

8. An HVAC system comprising:

an air handler having an air inlet, an airflow direction control mechanism configured to selectively direct airflow out of the air handler to a first outlet or a second outlet, or simultaneously to both the first outlet and the second outlet;

a blower coupled to the air handler selectively operable at a plurality of blowing speeds to generate airflow through the air handler;

an air duct connected to the air handler and having a tubular housing defining and completely surrounding both a first airflow path and a second airflow path that is separate from the first airflow path, a first end of the tubular housing defining a first air inlet in fluid communication with only the first airflow path and a second air inlet in fluid communication with only the second airflow path, a second end of the tubular housing defining a first air outlet in fluid communication with only the first airflow path and a second air outlet in fluid communication with only the second airflow path, the first air inlet and the second air inlet being adjacent to one another at the first end of the tubular housing and the first air outlet and the second air outlet being adjacent to one another at the second end of the tubular housing, the first air inlet being in direct fluid communication with the first outlet of the air handler and the second air inlet being in direct fluid communication with the second outlet of the air handler, the first airflow path occupying at least 50% of an overall cross-sectional area of the tubular housing; and a vent assembly having a housing that surrounds both first airflow directing members and second airflow directing members, the vent assembly being installed to the tubular housing at the second end of the tubular housing such that the first airflow directing members direct airflow from the first air outlet in a first direction away from the tubular housing and the second airflow directing members direct airflow from the second air outlet in at least a second direction away from the tubular housing.

9. The HVAC system according to claim 8, wherein the first airflow path occupies approximately 75% of an overall cross-sectional area of the tubular housing with the second airflow path occupying a remainder of the overall cross-sectional area of the tubular housing.

10. The HVAC system according to claim 8, wherein the air duct further includes a second tubular housing defining a third airflow path and a fourth airflow path, the second tubular housing defining and completely surrounding both a third airflow path and a fourth airflow path that is separate and independent of the third airflow path.

11. The HVAC system according to claim 10, wherein the second tubular housing defines a third end that includes a third air inlet in fluid communication with only the third airflow path and a fourth air inlet in fluid communication with only the fourth airflow path.

12. The HVAC system according to claim 11, wherein the second tubular housing has a fourth end that includes a third air outlet in fluid communication with only the third airflow path and a fourth air outlet in fluid communication with only the fourth airflow path.

13. The HVAC system according to claim 12, wherein the first end of the tubular housing and the third end of the second tubular housing are adjacent to one another with the first, second, third and fourth air inlets being adjacent to one another.

14. The HVAC system according to claim 13, wherein the second end of the tubular housing defines first distal end of the air duct relative to the first end of the tubular housing, and the fourth end of the second tubular housing defines a second distal end of the air duct relative to the third end of the second tubular housing with the first, second, third and fourth air inlets being located centrally between the first distal end and the second distal end.

15. The HVAC system according to claim 1, wherein the first airflow path occupies approximately 50% of an overall cross-sectional area of the tubular housing with the second airflow path occupying a remainder of the overall cross-sectional area of the tubular housing.

16. The HVAC system according to claim 1, wherein the air duct further includes a second tubular housing defining a third airflow path and a fourth airflow path, the second tubular housing defining and completely surrounding both a third airflow path and a fourth airflow path that is separate and independent of the third airflow path.

17. The HVAC system according to claim 16, wherein the second tubular housing defines a third end that includes a third air inlet in fluid communication with only the third airflow path and a fourth air inlet in fluid communication with only the fourth airflow path.

18. The HVAC system according to claim 17, wherein the second tubular housing has a fourth end that includes a third air outlet in fluid communication with only the third airflow path and a fourth air outlet in fluid communication with only the fourth airflow path.

19. The HVAC system according to claim 18, wherein the first end of the tubular housing and the third end of the second tubular housing are adjacent to one another with the first, second, third and fourth air inlets being adjacent to one another.

20. The HVAC system according to claim 19, wherein the second end of the tubular housing defines first distal end of the air duct relative to the first end of the tubular housing, and the fourth end of the second tubular housing defines a second distal end of the air duct relative to the third end of the second tubular housing with the first, second, third and fourth air inlets being located centrally between the first distal end and the second distal end.

\* \* \* \* \*